United States Patent [19]

Steinke

[11] 4,278,361
[45] Jul. 14, 1981

[54] CHANNEL INTERCONNECTION APPARATUS

[75] Inventor: Mark H. Steinke, North Aurora, Ill.

[73] Assignee: Lyon Metal Products, Incorporated, Aurora, Ill.

[21] Appl. No.: 28,977

[22] Filed: Apr. 11, 1979

[51] Int. Cl.³ .............................................. F16B 7/04
[52] U.S. Cl. .................................... 403/189; 403/176; 403/231; 403/344
[58] Field of Search ............... 403/231, 217, 218, 219, 403/230, 187, 189

[56] References Cited

U.S. PATENT DOCUMENTS

| 2,345,650 | 4/1944 | Attwood | 52/710 X |
|---|---|---|---|
| 3,513,606 | 5/1970 | Jones | 52/243 X |
| 3,574,378 | 4/1971 | Heywood | 403/231 |
| 3,669,479 | 6/1972 | Payne | 403/230 |

FOREIGN PATENT DOCUMENTS

| 2142621 | 3/1973 | Fed. Rep. of Germany | 403/188 |
|---|---|---|---|
| 761740 | 11/1956 | United Kingdom | 151/38 |

OTHER PUBLICATIONS

"Unistrut", General Engineering Catalog 7R, Unistrut Corp., 1975, pp. 7, 33, 35, 36.

Primary Examiner—Wayne L. Shedd
Attorney, Agent, or Firm—Vogel, Dithmar, Stotland, Stratman & Levy

[57] ABSTRACT

A rectangular channel member has coplanar spaced-apart wall portions defining a slot therebetween and each having a flange extending from the slot inwardly of the channel member and away from the other wall portion at an acute angle. A generally U-shaped connector is disposable within the channel member across the slot and includes rectangular recesses receiving the flanges therein. A threaded fastener engageable with the connector extends through the slot for engagement with a support member, tightening of the fastener causing deformation of the flanges by the connector for wedging the flanges in the connector recesses. The support member may constitute a bracket for coupling the channel member to another channel member, several different bracket constructions being disclosed for coupling to different types of channel members and for different orientations of the channel members.

3 Claims, 16 Drawing Figures

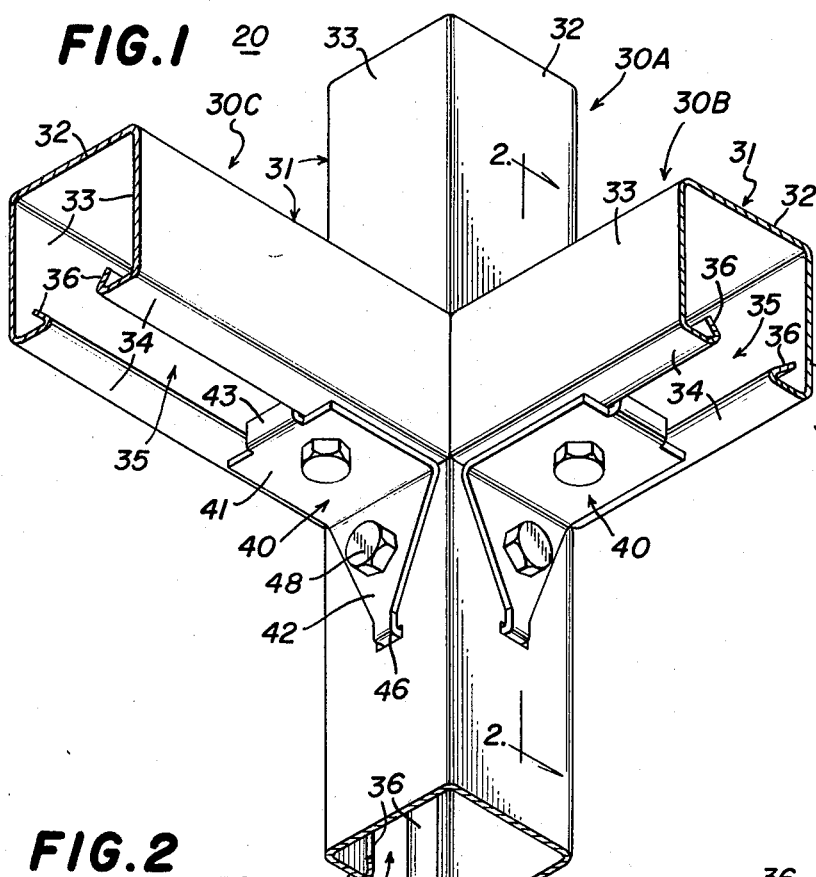
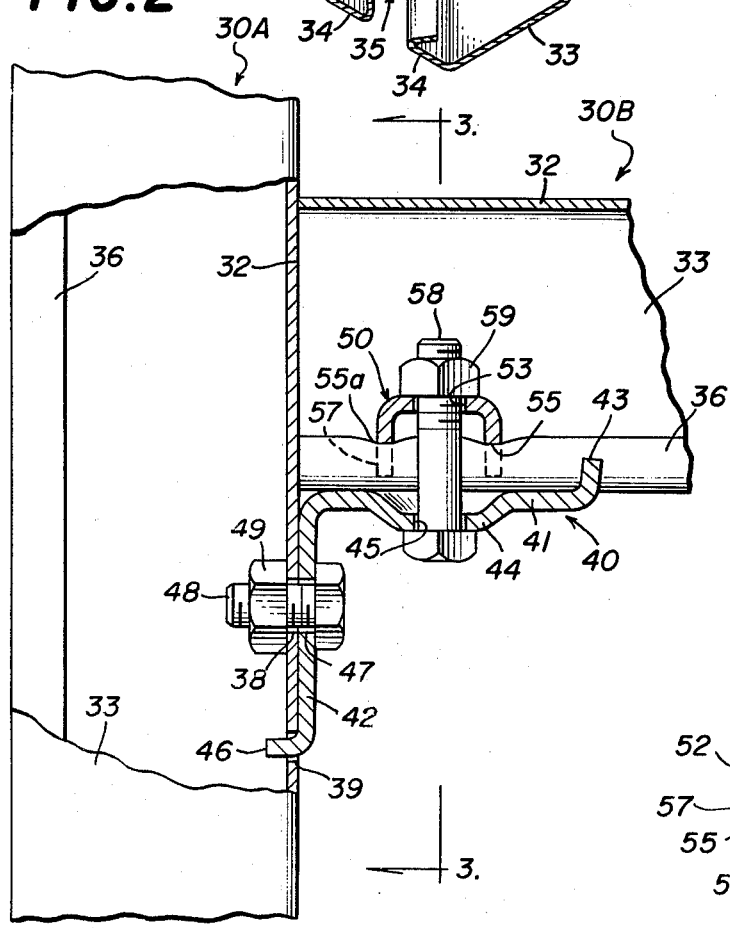
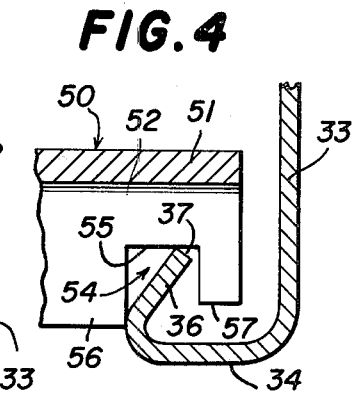
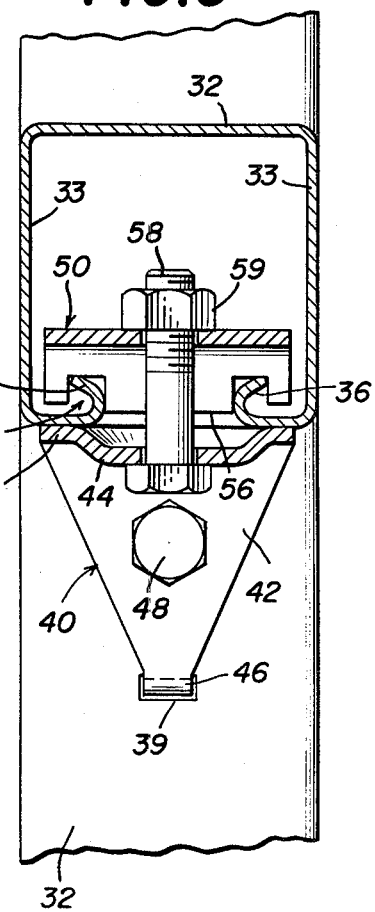
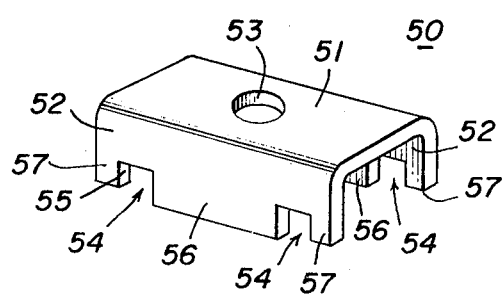

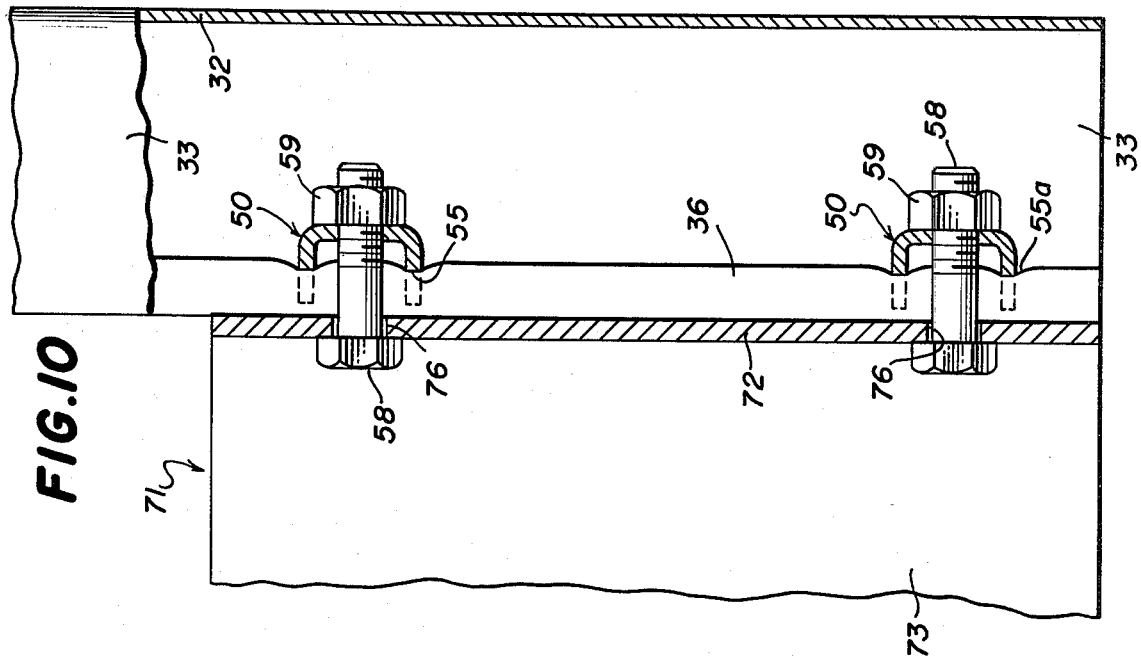
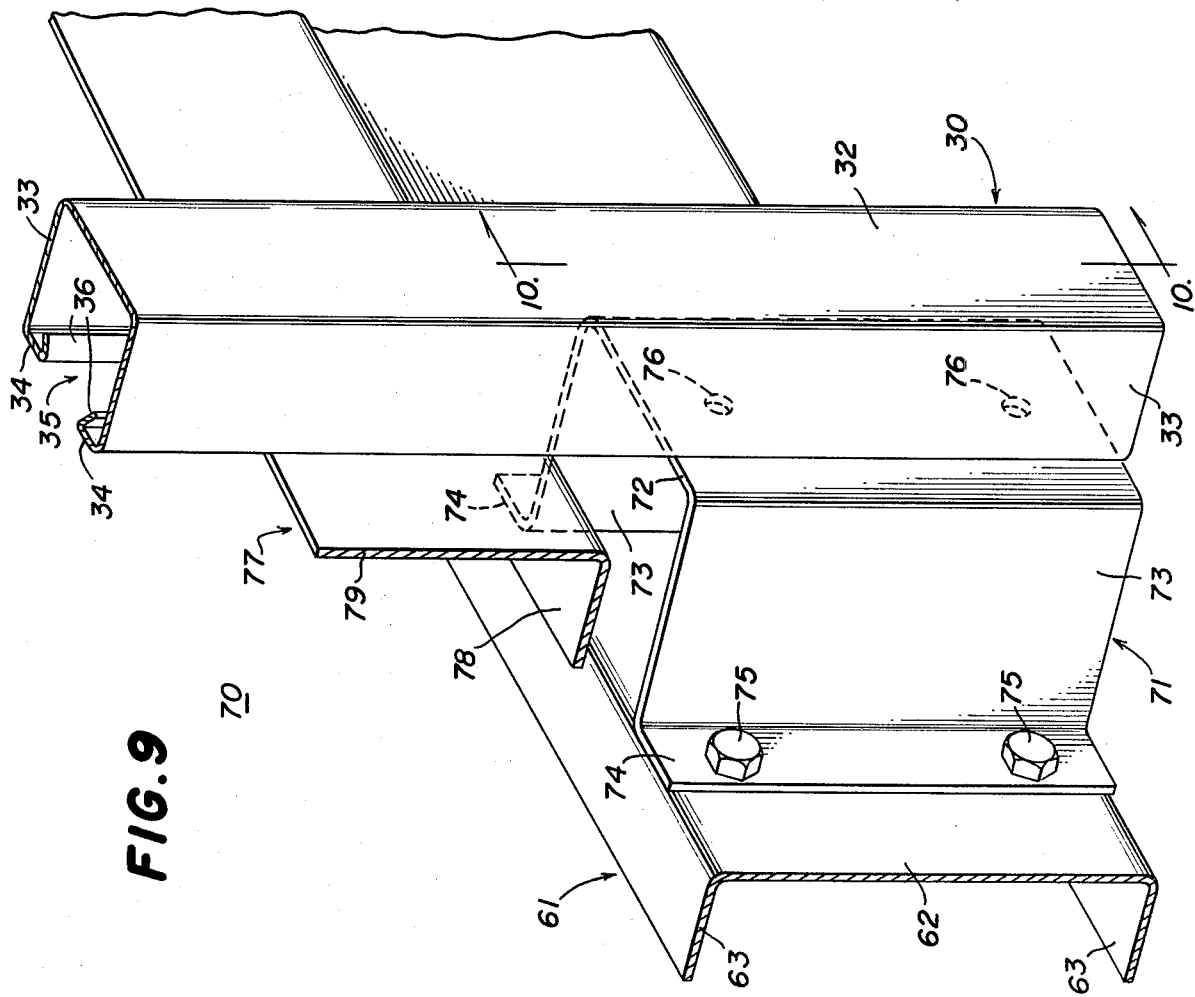

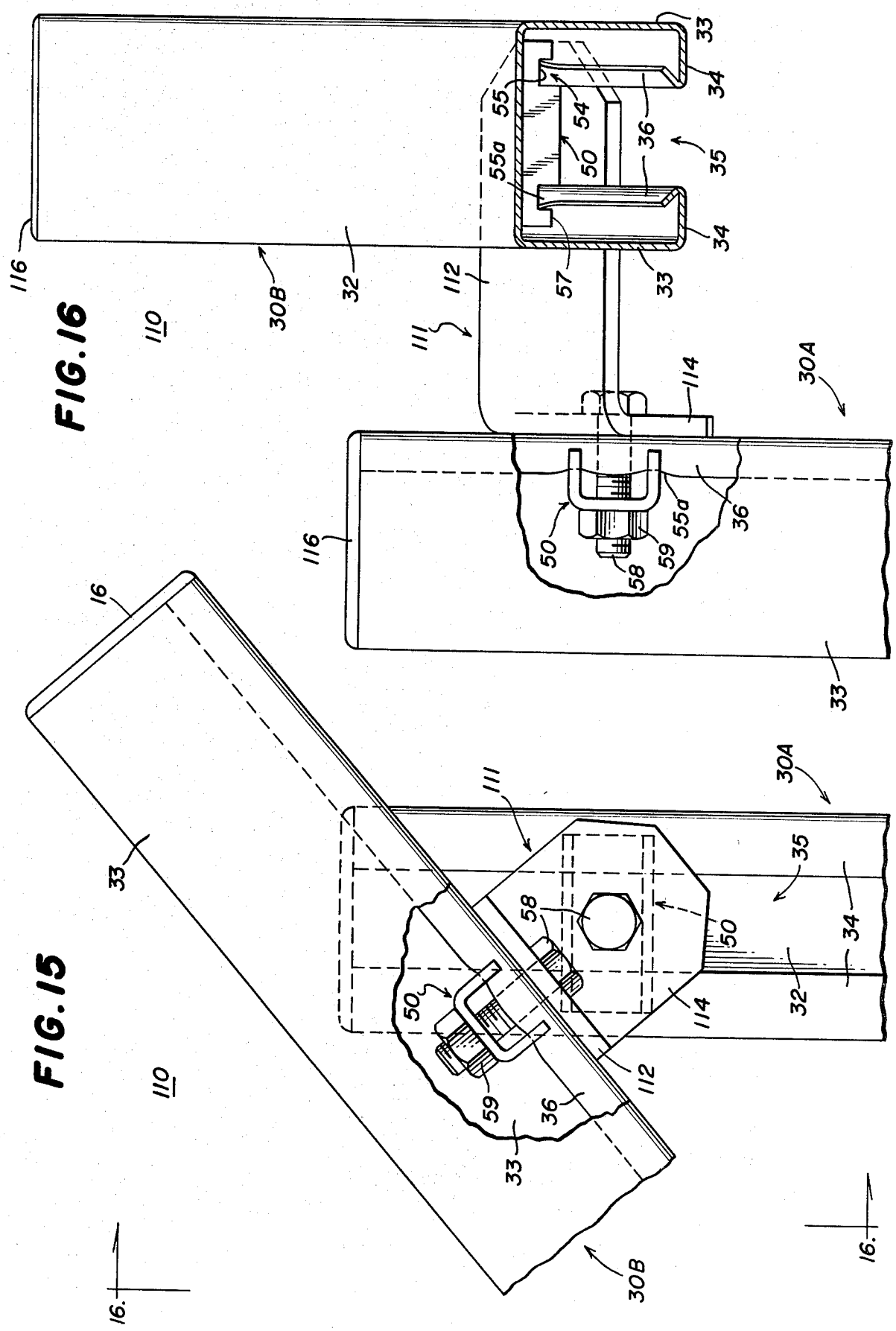

CHANNEL INTERCONNECTION APPARATUS

BACKGROUND OF THE INVENTION

The present invention relates to channel members and means for connecting channel members to each other and to other structural members.

The invention particularly relates to means for interconnecting the frame members of storage rack assemblies known as deckovers or mezzanines. These storage rack assemblies are typically used in factories, warehouses or the like for providing one or more additional floors or levels of storage space in a high-ceilinged building. But it will be appreciated that the present invention has general utility to any type of structural interconnection application where it is desired to connect channel members to each other or to other types of structural members.

Generally, the frames of mezzanine or deckover assemblies comprise a plurality of interconnected posts and beams as well as stiffening and rigidifying members, the posts and beams typically being channel members. The most common types of channel members used are either U-shaped in transverse cross section or are generally rectangular in transverse cross section with one of the side walls having an elongated slot formed therein running the length of the member to form the channel.

Many types of fastening or interconnection means are used in the prior art for joining such channel members to each other or to other structural members in the assembly. Some systems utilize posts having rows of apertures formed therein extending the length thereof and adapted to receive therein studs or other fastening members which are either formed integrally with or fastened to the associated beams. Because of the weakening of the member occasioned by the rows of apertures therein, the apertured channels are suitable only for use as posts or columns and, therefore, the beams must be of different construction, thereby tending to increase the number of different types of parts which must be made for a given system. Furthermore, the apertured posts are more expensive to produce than non-apertured posts.

In all prior art storage rack or deckover systems, it is desirable to provide interconnection apparatus which will effect a firm and tight interconnection among the structural members and which will resist loosening in use. But prior art systems have, to date, been unsuccessful in achieving a truly tight interconnection.

SUMMARY OF THE INVENTION

The present invention relates to a unique system for interconnecting structural channel members with each other and with other structural members.

It is a general object of the invention to provide interconnection apparatus which is characterized by great flexibility in that it permits the interconnection of channel members with a wide variety of different types of members and in a wide variety of positions or orientations.

It is another object of this invention to provide interconnection apparatus for providing a tight interconnection of channel members with other structural members, which interconnection is resistant to loosening in use.

These and other objects of the present invention are attained by providing a combination comprising a support member, a channel member having spaced-apart wall portions defining a slot therebetween, each of the wall portions having a flange thereon extending therefrom inwardly of the channel member, a connector dimensioned to be disposed in a connecting position within the channel member transversely across the slot, the connector having deforming means thereon engageable with the flanges when the connector is disposed in its connecting position, and adjustable fastening means adapted to be disposed through the slot in engagement with the support member and the connector for holding them tightly together with the channel member, the deforming means deforming the flanges when the connector and the channel member and the supporting member are moved firmly together by the fastening means to an assembled condition.

Further features of the invention pertain to the particular arrangement of the parts of the channel interconnection whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a fragmentary perspective view of an interconnection of three channel members at right angles to one another, constructed in accordance with and embodying the features of the present invention;

FIG. 2 is an enlarged fragmentary view in partial vertical section taken along the line 2—2 in FIG. 1;

FIG. 3 is a view in vertical section taken along the line 3—3 in FIG. 2;

FIG. 4 is a further enlarged fragmentary view in vertical section of the right-hand portion of the channel-connector interconnection of FIG. 3, illustrated in its position before tightening of the bolt;

FIG. 5 is a perspective view of the hold-down connector of the present invention;

FIG. 9 is a fragmentary perspective view illustrating the manner in which a channel member of the present invention may be assembled with other structural members;

FIG. 10 is an enlarged fragmentary view in vertical section taken along the line 10—10 in FIG. 9;

FIG. 15 is a fragmentary front elevational view of an assembly in accordance with the present invention for interconnecting two channel members of the present invention; and FIG. 16 is a fragmentary side elevational view of the assembly of FIG. 15, taken along the line 16—16.

DESCRIPTION OF THE PREFERRED EMBODIMENTS

Figure 6:
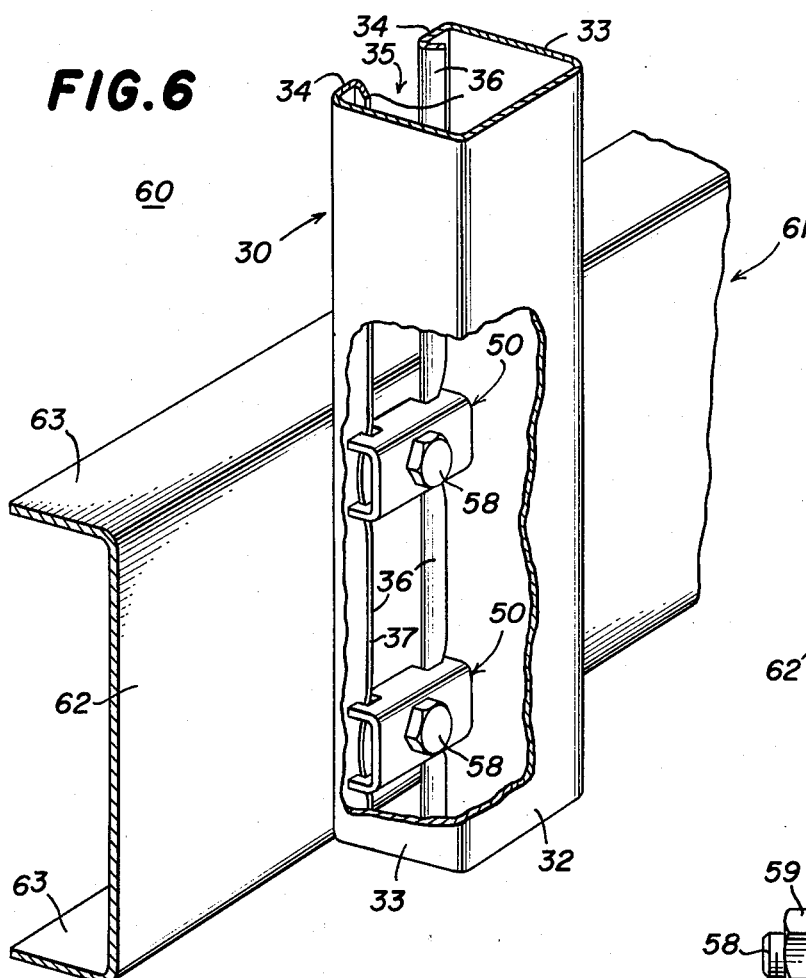
FIG. 6 is a fragmentary perspective view of an assembly wherein a channel member of the present invention is connected by the interconnection apparatus of the present invention to another channel member.

Referring to FIGS. 1 through 5 of the drawings, there is illustrated an assembly, generally designated by the numeral 20, of three channels, each generally designated by the numeral 30, the channels being interconnected by means of support brackets 40 and hold-down connectors or clips 50. The channels 30 are substantially identical in construction, but have been respectively designated by the suffixes A, B and C added after the numeral 30 to facilitate explanation of the assembly 20.

Each of the channels 30A-30C comprises a wall structure, generally designated by the numeral 31, which is generally rectangular in transverse cross section, the wall structure 31 including a flat rectangular rear wall 32 and flat rectangular side walls 33 which are disposed substantially parallel to each other and are respectively provided at the distal ends thereof with front wall portions 34 which are substantially coplanar and parallel to the rear wall 32. The front wall portions 34 are spaced apart and cooperate to define therebetween an elongated slot 35 extending the length of the wall structure 31. Each of the front wall portions 34 is integral at the inner end thereof with a flange 36 which extends inwardly of the wall structure 31 away from the slot 35 back over the associated front wall portion 34 at an angle of approximately fifty degrees with respect thereto, each flange 36 terminating in a distal edge 37. The channel 30A has formed in each of the rear wall 32 and one of the side walls 33 thereof a circular aperture 38 and, spaced a predetermined distance therefrom in longitudinal alignment therewith, a rectangular slot 39. It will be appreciated that, if desired, the other side wall 33 of the channel 30A could also be provided with an aperture 38 and slot 39, as could any of the walls 32 or 33 of the channels 30B and 30C, but they are not shown in FIG. 1 since they are unnecessary for an explanation of the assembly 20.

Two identically-constructed support brackets 40 are provided, one between the channels 30A and 30B and the other between the channels 30A and 30C. Since the support brackets 40 are identical in construction and operation, only the support bracket 40 between the channels 30A and 30B and its assembly thereto will be described in detail, it being understood that the identical arrangement is used for interconnecting the channels 30A and 30C.

The support bracket 40 is generally L-shaped and of integral one-piece construction, including a generally rectangular arm 41 and a generally triangular arm 42 extending from one end of the arm 41 substantially normal thereto. In the unassembled condition of the support bracket 40, the arms 41 and 42 thereof are inclined at an angle of approximately ninety-five degrees with respect to each other, for a purpose which will be explained more fully below. Integral with the arm 41 at the distal end thereof and extending upwardly therefrom substantially normal thereto is a tab 43 having a width slightly less than the width of the slots 35 in the channels 30. Centrally of the arm 41 there is formed a depressed portion 44 having an aperture 45 formed therethrough centrally thereof. Integral with the arm 42 at the distal end thereof and extending outwardly therefrom substantially normal thereto is a tab 46. Extending through the arm 42 generally centrally thereof is a circular hole 47.

In use, the support bracket 40 is arranged with the arm 42 thereof in back-to-back engagement with the outer surface of the rear wall 32 of the channel 30A, with the tab 46 extending through the slot 39. The circular hole 47 is positioned so that when the tab 46 is thus disposed in the slot 39, the hole 47 will be disposed in registry with the aperture 38 in the rear wall 32 of the channel 30A. The arm 41 is disposed in engagement with the outer surfaces of the front wall portions 34 of the channel 30B spanning the slot 35 thereof, and with the tab 43 extending upwardly into the slot 35. The arm 42 is secured to the channel 30A by means of a bolt 48 extending through the aligned hole 47 and aperture 38 and secured by a nut 49.

The arm 41 is secured to the channel 30B by the use of a hold-down connector 50, which is generally U-shaped and of integral one-piece construction, including a substantially rectangular end wall 51 integral along each of the opposite side edges thereof with a side wall 52 extending therefrom substantially normal thereto. Formed through the end wall 51 centrally thereof is a circular hole 53. The side walls 52 are substantially mirror images of each other, each having two rectangular notches or recesses 54 formed in the distal edge thereof respectively adjacent to the opposite ends thereof, each of the notches or recesses 54 in one of the side walls 52 being aligned with a corresponding one of the notches 54 in the other side wall 52 along an axis substantially perpendicular to the side walls 52. Each of the notches 54 defines an inverted U-shaped deforming surface 55 for a purpose to be described more fully below. The notches 54 on each of the side walls 52 cooperate to divide that side wall into a middle leg 56 and two end legs 57, with the middle leg extending from the end wall 51 a greater distance than the end legs 57.

In use, the hold-down connector 50 is disposed within the channel 30B, as by sliding it in from one of the open ends of the channel 30B. The hold-down connector 50 is arranged in a connecting position extending transversely across the slot 35 of the channel 30B, with the middle legs 56 extending into the slot 35 and being dimensioned to extend substantially all the way thereacross. The notches 54 of each of the side walls 52 are respectively dimensioned for receiving therein the flanges 36 of the channel 30B, as best illustrated in FIG. 4. The hold-down connector 50 is slid longitudinally along the channel 30B until the hole 53 thereof is disposed in registry with the aperture 45 in the arm 41 of the support bracket 40. A bolt 58 is then passed upwardly through the aligned aperture 45 and hole 53 and is threadedly engaged with a nut 59 disposed within the channel 30B and above the hold-down connector 50. As the bolt 58 and nut 59 are tightened, the hold-down connector 50 and the arm 41 of the support bracket 40 are drawn together. During this movement, the distal edges 37 of the flanges 36 engage the deforming surfaces 55 of the notches 54 and ride laterally outwardly therealong, thereby deforming the flanges 36, bending them downwardly toward the front wall portions 34 of the channel 30B and wedging them tightly into the notches 54. The resulting crimps or deformations in the flanges 36 are designated by the reference numeral 55a. It will be appreciated that the wedging engagement of the flanges 36 in the notches 54 serves securely to fasten the hold-down connector 50 to the channel 30B in a tight interconnection which is resistant to loosening as by vibration or the like.

Preferably, the channel 30B is first assembled to the arm 41 of the support bracket 40 in the manner just described and, thereafter, the arm 42 of the support bracket 40 is assembled to the channel 30A. As the bolt 48 and nut 49 are tightened, the arm 42 is drawn flush against the rear wall 32 of the channel 30A, thereby drawing the adjacent end of the channel 30B snugly against the rear wall 32 of the channel 30A and, in the process, deflecting the arms 41 and 42 of the support bracket 40 toward each other to the configuration illustrated in FIG. 2, wherein there is a substantially ninety degree angle therebetween.

It will be appreciated that when the parts are assembled in the manner illustrated in FIG. 1, the tab 43 cooperates with the front wall portions 34 to prevent rotational movement of the channel 30B with respect to the support bracket 40, while the engagement of the tab 46 in the slot 39 prevents rotational movement of the channel 30A with respect to the support bracket 40, thereby further serving to inhibit loosening of the assembled interconnection.

It will be understood that the channel 30C is assembled to the channel 30A in the same manner, by the use of the other support bracket 40 and hold-down connector 50, for connecting the adjacent end of the channel 30C tightly against a side wall 33 of the channel 30A.

It is also noted that the width of the hold-down connector 50 between the side walls 52 thereof is such that the hold-down connector 50 can be passed through the slot 35 of a channel 30 when aligned parallel thereto. This is particularly useful when the channel 30 is to be connected intermediate the ends thereof to another structural member.

Figure 8:
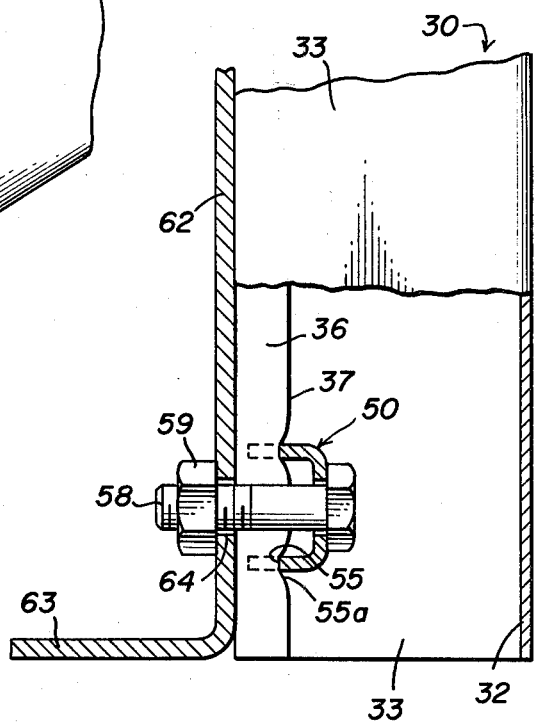
FIG. 8 is a fragmentary view in vertical section, taken along the line 8—8 in FIG. 7.
Figure 7:
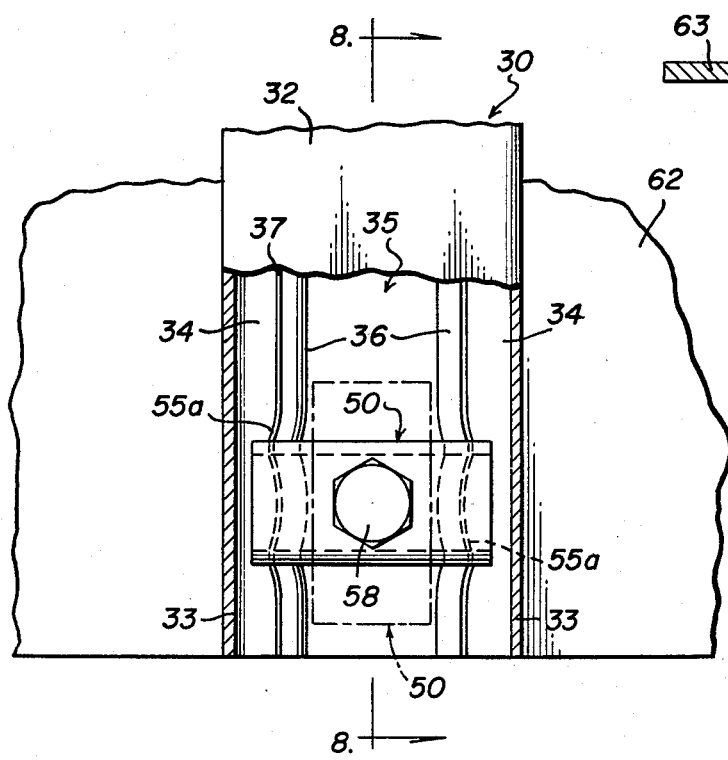
FIG. 7 is an enlarged, fragmentary, front elevational view, in partial vertical section, of the lower portion of the assembly of FIG. 6, illustrating how the hold-down connector is inserted into the channel member.

Referring now to FIGS. 6 through 8 of the drawings, there is illustrated another assembly, generally designated by the numeral 60, of a channel 30 with a different type of channel, generally designated by the numeral 61. The channel 61 includes a relatively wide rectangular main wall 62 integral at the opposite longitudinal side edges thereof, respectively, with flanges 63 extending from the main wall 62 substantially normal thereto and parallel to each other. Formed through the main wall 62 and spaced apart laterally thereof are two circular holes 64.

In the assembly 60, the channel 30 is connected directly to the channel 61 without the use of any intervening support bracket. Thus, the channel 30 is arranged with the longitudinal axis thereof extending laterally of the main wall 62 of the channel 61, and with the outer surfaces of the front wall portions 34 of the channel 30 disposed in back-to-back engagement with the outer surface of the main wall 62 of the channel 61 and with the holes 64 registering with the slot 35 of the channel 30. Two of the hold-down connectors 50 are disposed within the channel 30, with the holes 53 thereof respectively registering with the holes 64 of the channel 61, the bolts 58 being passed through these aligned holes and threadedly engaged with nuts 59 for assembling the parts together in the same manner as was described above in connection with FIGS. 1 through 5. Thus, as the bolts 58 and nuts 59 are tightened, the channels 30 and 61 are drawn together and, in the process, the flanges 36 of the channel 30 are wedged and crimped in the notches 54 of the hold-down connectors 50, thereby to provide a tight connection between the channels 30 and 61.

It will be noted that the upper one of the hold-down connectors 50 in the assembly 60 will be well up within the channel 30 a substantial distance from the end thereof, thereby making it difficult or impossible to effect the interconnection by introduction of the hold-down connector 50 into the channel 30 from an end thereof. For this reason, the width of the hold-down connector is slightly less than the width of the slot 35 of the channel 30 so that, when aligned lengthwise of the slot 35, the hold-down connector 50 can be inserted upwardly therethrough anywhere therealong, as indicated in FIG. 7. For this type of assembly, the hold-down connectors 50 are preferably first loosely assembled to the channel 61 (or other structural member to which the channel 30 is to be connected) and then turned so as to be aligned longitudinally of the slot 35. The slot 35 is then placed down over the hold-down connectors 50 which are then, by use of the bolts 58, pushed inwardly of the channel 30 and turned ninety degrees until they are arranged in their connecting positions extending transversely across the slot 35 with the flanges 36 in the notches 54. The bolts 58 and nuts 59 can then be tightened in the usual manner.

Referring now to FIGS. 9 and 10 of the drawings, there is illustrated an assembly, generally designated by the numeral 70, which constitutes an alternative arrangement for interconnecting the channels 30 and 61, this arrangement being useful when it is desired to have the channel 30 spaced from the channel 61. For this purpose, there is provided a generally U-shaped support bracket, generally designated by the numeral 71, which is of integral one-piece construction and includes a flat rectangular end wall 72 provided along each of the opposite side edges thereof with a side wall 73 extending therefrom substantially normal thereto. Each of the side walls 73 is provided at the distal end thereof with an outturned attachment flange 74, the flanges 74 being substantially coplanar and parallel to the end wall 72. Formed through the end wall 72 centrally thereof are two longitudinally spaced-apart holes 76.

In use, the support bracket 71 is disposed with the attachment flanges 74 thereof in back-to-back engagement with the outer surface of the main wall 62 of the channel 61 and extending laterally thereacross and fixedly secured thereto by suitable bolts 75 extending through complementary apertures therein (not shown) and threadedly engaged with complementary nuts. The channel 30 is disposed with the outer surfaces of the front wall portions 34 thereof in back-to-back engagement with the outer surface of the end wall 72 of the support bracket 71, and with the holes 76 aligned longitudinally of the channel slot 35. Two hold-down connectors 50 are disposed within the channel 30 for assembly to the support bracket 71 by means of bolts 58 and nuts 59 in the same manner as was described above in connection with FIGS. 6–8, thereby to provide a firm interconnection between the channel 30 and the support bracket 71.

It will be appreciated that the channel 30 is now oriented with respect to the channel 61 in the same manner as was illustrated in the assembly 60 of FIG. 6, but that a predetermined space has now been provided between the two channels. This standoff space may be necessary to accommodate decking or other structural members overlying the channel 61. Thus, there is illustrated in FIG. 9 a portion of a kickplate 77 which is typically used to provide a curb around the peripheral edge of a deck, the kickplate 77 including an attachment flange 78 adapted to be fixedly secured to the decking and an upstanding kick flange 79.

Figure 12:
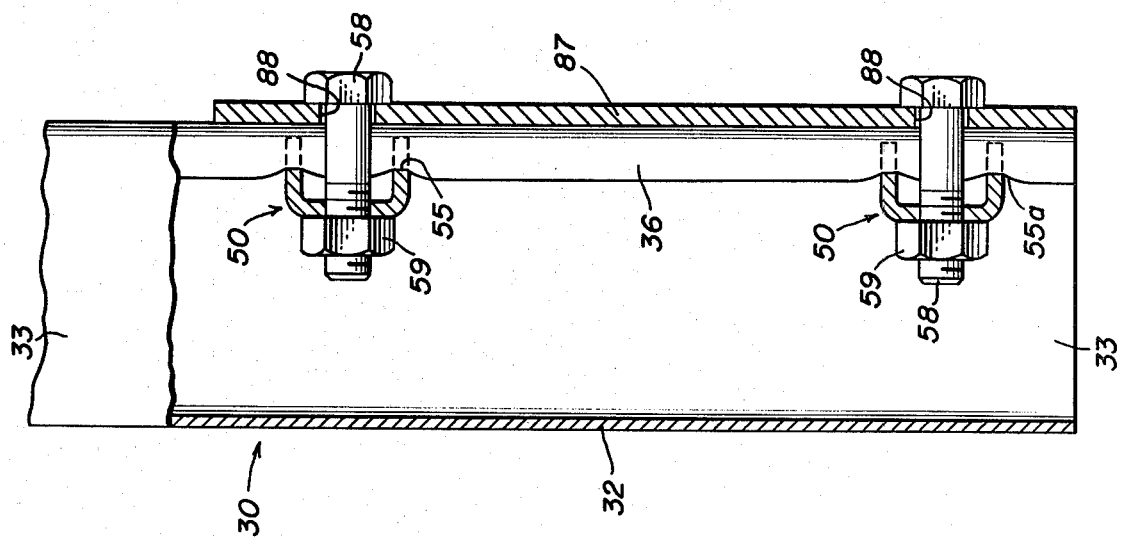
FIG. 12 is an enlarged fragmentary view in vertical section taken along the line 12—12 in FIG. 11.
Figure 11:
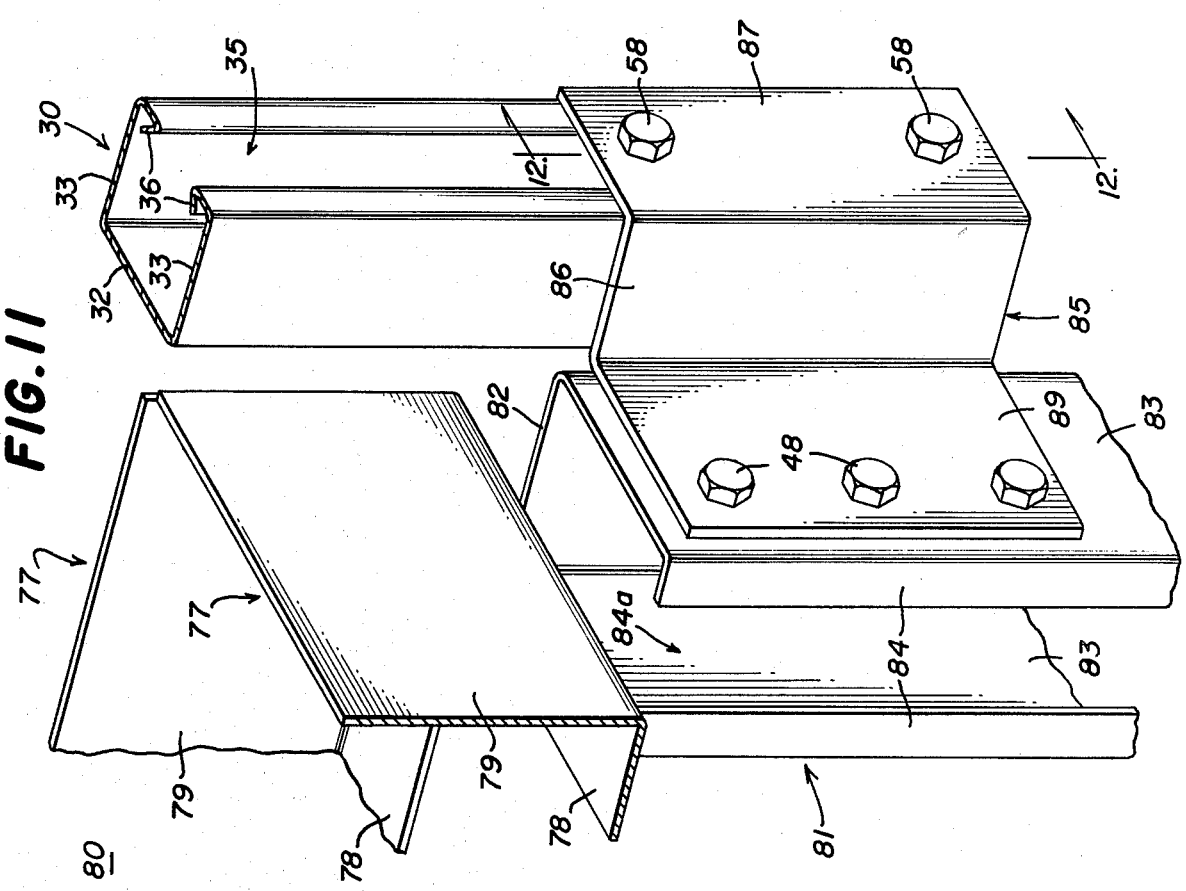
FIG. 11 is a fragmentary perspective view illustrating the manner of connecting a channel member of the present invention with other structural members in still another assembly.

Referring now to FIGS. 11 and 12 of the drawings, there is illustrated still another assembly, generally designated by the numeral 80, for coupling a channel 30 in parallel offset relationship to another structural member, such as a channel 81. The channel 81 is of integral one-piece construction and includes a rectangular end wall 82 and two rectangular side walls 83, each provided at the distal end thereof with an inwardly extending wall portion 84, the wall portions 84 being substantially coplanar and spaced apart to define a slot 84a therebetween. Thus, the channel 81 is similar in transverse cross section to the channel 30, except that it does not include flanges corresponding to the flanges 36.

For interconnecting the channels 30 and 81, there is provided a generally Z-shaped support bracket 85, which is of integral one-piece construction and includes a rectangular central plate 86 integral at one longitudinal edge thereof with an attachment flange 87 extending therefrom substantially normal thereto and integral at the other longitudinal edge thereof with an attachment flange 89 extending therefrom parallel to the attachment flange 87 but in the opposite direction therefrom.

In the assembly 80, the attachment flange 89 is fixedly secured to one of the side walls 83 of the channel 81 as by a plurality of bolts 48 extending through complementary openings therein and threadedly engaged with mating nuts (not shown), with the central plate 86 extending laterally outwardly away from the side wall 83. The channel 30 is then disposed inside the right angle formed between the central plate 86 and the attachment flange 87, and with the slot 35 of the channel 30 disposed toward the attachment flange 87 and in alignment with spaced-apart apertures 88 formed therethrough. The channel 30 is connected to the attachment flange 87 by means of two hold-down connectors 50 disposed within the channel 30 and cooperating with bolts 58 extending through the apertures 88 and threadedly engaging nuts 59, in the same manner as was described above in connection with FIGS. 6–10.

As is clear from FIG. 12, the crimping of the flanges 36 of the channel 30, as at 55a, by the hold-down connectors 50 serves not only to effect a tight interconnection resistant to loosening, but also, where the crimped flanges 36 extend vertically, the crimping serves effectively to prevent vertical sliding movement of the channel 30 with respect to the hold-down connectors 50, even when the channel 30 is under substantial vertical loading. It will also be appreciated from FIG. 11 that the assembly 80 permits an offset mounting of the channel 30 which is useful in providing clearance for decking or the like which overlies the upper end of the channel 81. Thus, to illustrate this feature, two kickplates 77 are illustrated in positions they might occupy at the corner of a deck, for which the channel 81 might provide a corner support post.

Figure 14:
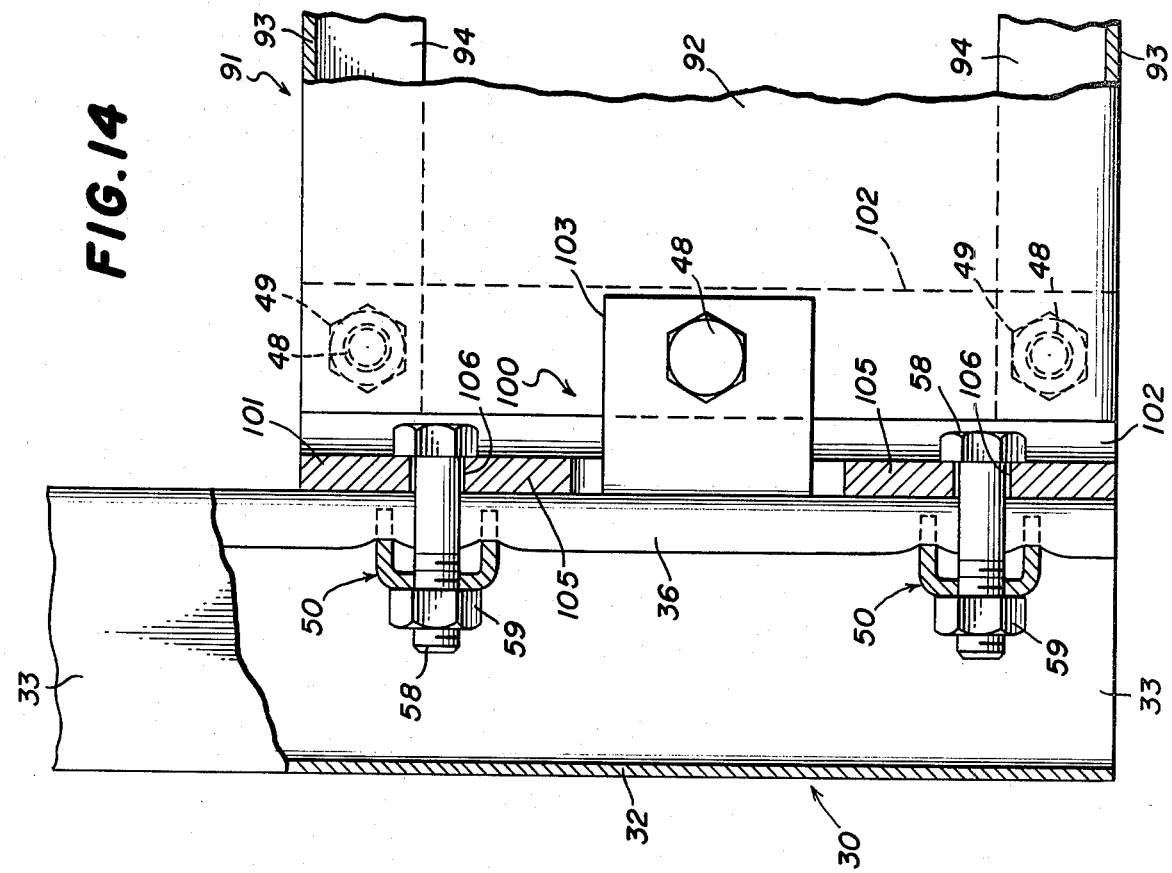
FIG. 14 is an enlarged fragmentary view in vertical section taken along the line 14—14 in FIG. 13.
Figure 13:
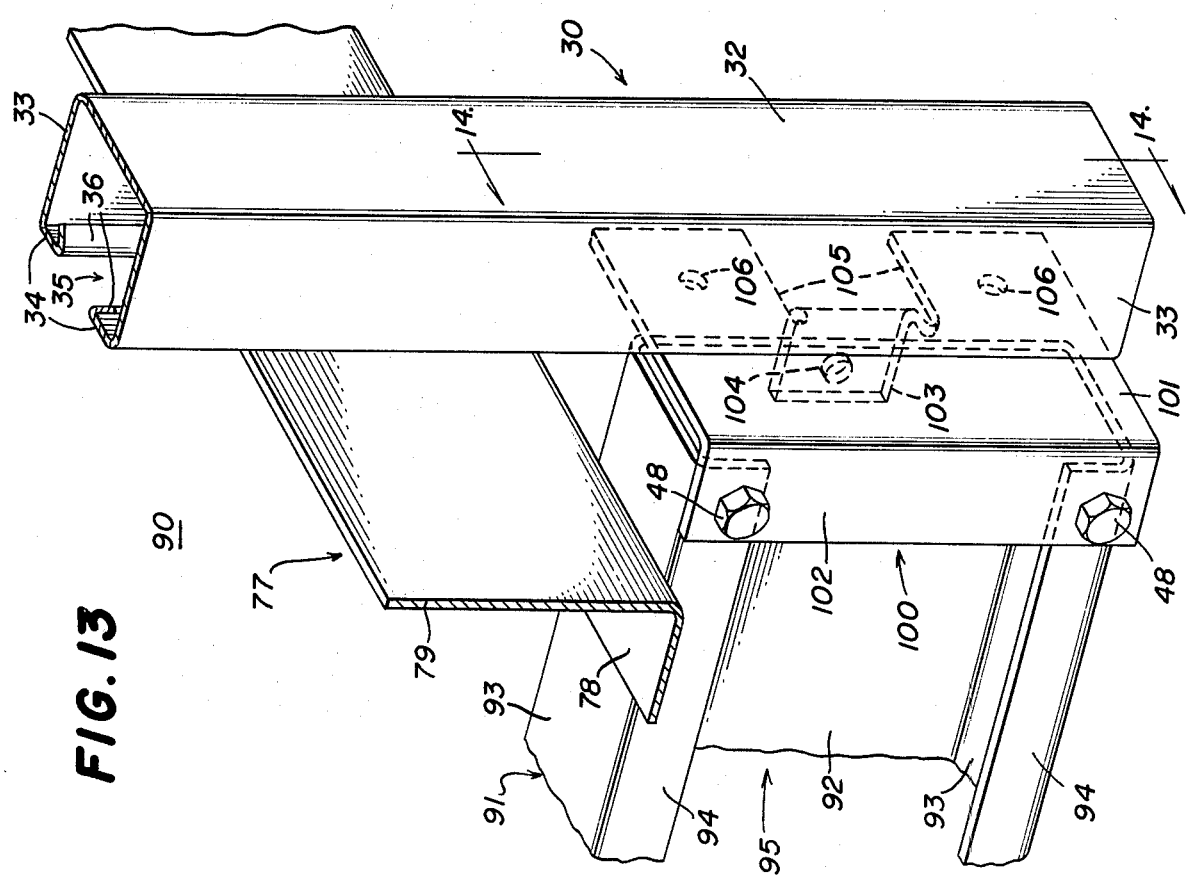
FIG. 13 is a fragmentary perspective view illustrating apparatus for connecting a channel member of the present invention to other structural members in yet another assembly.

Referring now to FIGS. 13 and 14 of the drawings, there is illustrated still another assembly, generally designated by the numeral 90, for connecting a channel 30 to the end of still another type of channel 91, at right angles thereto. The channel 91 is of integral one-piece construction and includes a flat rectangular end wall 92 provided at each of the longitudinal edges thereof with a side wall 93 extending therefrom substantially normal thereto, each of the side walls 93 being provided at the distal edge thereof with an inwardly extending front wall portion 94. The wall portions 94 are substantially coplanar and spaced apart for defining therebetween a slot 95 extending the length of the channel 91.

There is also provided a support bracket, generally designated by the numeral 100, which includes a flat main plate 101, generally rectangular in shape and provided along one longitudinal edge thereof with an attachment flange 102 extending therefrom substantially normal thereto. Cut out from the other longitudinal edge of the main plate 101 centrally thereof is an attachment finger 103 which is bent out of the plane of the main plate 101 in the direction of the attachment flange 102 and substantially parallel thereto, the attachment finger 103 having a circular hole 104 formed therethrough generally centrally thereof. The cutout attachment finger 103 leaves a recess in the main plate 101 which separates it into two attachment arms 105, each provided with a circular hole 106 centrally therethrough.

In use, the support bracket 100 is disposed to cover an open end of the channel 91, the support bracket 100 being dimensioned so that, when thus arranged, the attachment flange 102 overlies and spans the front wall portions 94, while the attachment finger 103 overlies the end wall 92, whereby the end of the channel 91 is received between the attachment flange 102 and the attachment finger 103. The attachment flange 102 is fixedly secured to each of the front wall portions 94 of the channel 91 by a bolt 48 extending through complementary apertures therein and threadedly engaged with a mating nut 49. Similarly, the attachment finger 103 is fixedly secured to the end wall 92 of the channel 91 by a bolt 49 extending through the hole 104 and a complementary aperture in the end wall 92 for engagement with a mating nut (not shown). The channel 30 is disposed on the opposite side of the main plate 101 from the channel 91, and is arranged with the slot 35 thereof facing the attachment arms 105 and longitudinally aligned with the holes 106 therein. The channel 30 is connected to the attachment arms 105 by means of hold-down connectors 50 received within the channel 30 and cooperating with bolts 58 extending through the holes 106 and threadedly engaging nuts 59, in the same manner as was described above in connection with the previous embodiments. It will be appreciated that the support bracket 100 provides a slight spacing between the channels 30 and 91, the extent of this spacing depending upon the positioning of the apertures in the channel 91 to which the support bracket 100 is connected. The utility of this spacing is indicated by the illustration of a kickplate 77 in FIG. 13 overlying the channel 91, the latter being arranged as a beam for supporting decking or the like.

Referring now to FIGS. 15 and 16 of the drawings, there is illustrated an assembly, generally designated by the numeral 110, for interconnecting two channel members 30 at any desired angle with respect to each other. This assembly is particularly useful in constructing stairways to the deck level of a deckover or mezzanine construction. To facilitate explanation of the assembly 110, the channels 30 have respectively been designated by the suffixes A and B, the channel member 30A being disposed vertically as a support post or the like, and the channel 30B being inclined at an angle of approximately forty-five degrees with respect to the channel 30A.

To effect the interconnection in the assembly 110, there is provided a support bracket, generally designated by the numeral 111, which is substantially L-shaped and includes an elongated arm 112 and a shorter arm 114 extending from the arm 112 at one end thereof substantially normal thereto. Each of the arms 112 and 114 is provided with a circular hole therethrough (not shown). The arm 112 is preferably positioned for spanning the slot 35 in the channel 30A and is fixedly secured thereto by the use of a hold-down connector 50, as associated bolt 58 and a nut 59, in the same manner as was described above in the preceding embodiments. The arm 114 is disposed for spanning the slot 35 in the channel 30B and is fixedly secured thereto by the use of a hold-down connector 50.

While the elongated arm 112 is preferably disposed with the longitudinal axis thereof extending transversely across the slot 35, the arm 114 is tilted with respect to the longitudinal axis of the channel 30A at any desired angle. It will be appreciated that, if desired, the arm 112 could be tilted at any desired angle to the longitudinal axis of the channel 30B. Preferably, the aperture through the arm 112 is disposed adjacent to the distal end thereof, whereby there is provided a predetermined spacing between the channels 30A and 30B. When the channels 30A and 30B are disposed in an assembly in which they are likely to be contacted by users, as in a railing construction for a stairway, the open ends of the channels 30A and 30B, which typically have sharp edges, are preferably closed by end caps 116.

From the foregoing, it can be seen that there has been provided an improved channel construction which is uniquely adaptable for use with a novel hold-down connector for forming a firm interconnection with a support member.

There have also been provided several embodiments of support brackets for use in cooperation with the channel and hold-down connector of the present invention to facilitate interconnection of the channel with a wide variety of different structural members and in a wide variety of different configurations and orientations.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. The combination comprising a channel member having a rear wall and a pair of side walls and a pair of front walls and a pair of flanges, said side walls extending forwardly from said rear wall, said front walls extending toward each other from the forward ends of said side walls and defining a slot therebetween, said flanges respectively extending at an acute angle from the front walls in the region of said slot rearwardly and toward the associated side walls, the distal ends of said flanges being unattached, a connector dimensioned to be within said channel member transversely across said slot, said connector having two substantially U-shaped deforming surfaces which respectively define two notches that respectively encompass said flanges, the width of each of said notches being less than the width of each of said flanges and means for drawing said connector against said channel member to cause said flanges to be bendingly deformed respectively toward said front walls while being trapped by said notches.

2. The combination comprising two channel members, each of said channel members having a rear wall and a pair of side walls and a pair of front walls and a pair of flanges, said side walls extending forwardly from said rear wall, said front walls extending toward each other from the forward ends of said side walls and defining a slot therebetween, said flanges respectively extending at an acute angle from the front walls in the region of said slot rearwardly and toward the associated side walls, the distal ends of said flanges being unattached, a support member for attachment to one of said channel members, a connector dimensioned to be disposed within the other of said channel members transversely across the slot therein, said connector having two substantially U-shaped deforming surfaces which respectively define two notches that respectively encompass the flanges of said other channel member, the width of each of said notches being less than the width of each of said flanges and means passing through said support member and into said connector for drawing said support member against said other channel member to cause the flanges on said other channel member to be bendingly deformed respectively toward the front walls thereof while being trapped by said notches.

3. The combination of claim 2, wherein said one channel member has an aperture therein, said support member being generally L-shaped and includes first and second legs respectively engageable with said one and said other channel members, said first leg having a tab thereon dimensioned and arranged to be received in the slot of said other channel member for preventing rotation thereof with respect to said support member, said second leg having a tab thereon dimensioned and arranged to be received in the aperture of said one channel member for preventing rotation thereof with respect to said support member.

* * * * *